2 Sheets—Sheet 1.
S. W. PERKINS.
Check-Rower for Corn-Planter.
No. 210,143. Patented Nov. 19, 1878.
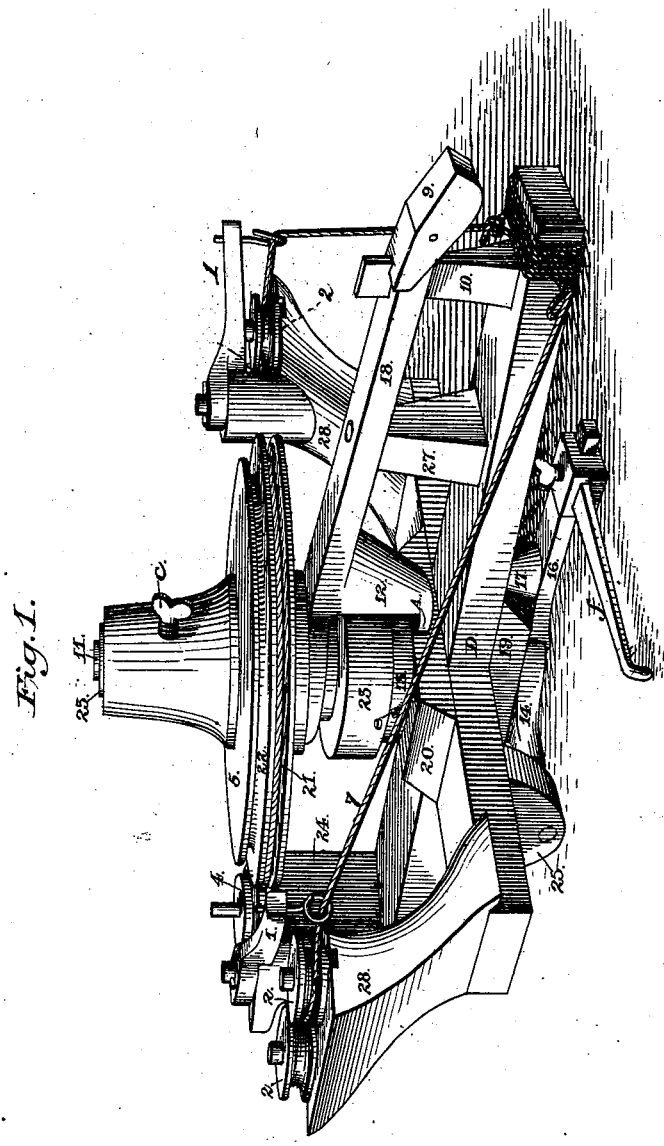
Attest:
Charles R. Wheeler
E. D. Richardson
Inventor:
Seth W. Perkins 2 Sheets—Sheet 2.
S. W. PERKINS.
Check-Rower for Corn-Planter.
No. 210,143. Patented Nov. 19, 1878.
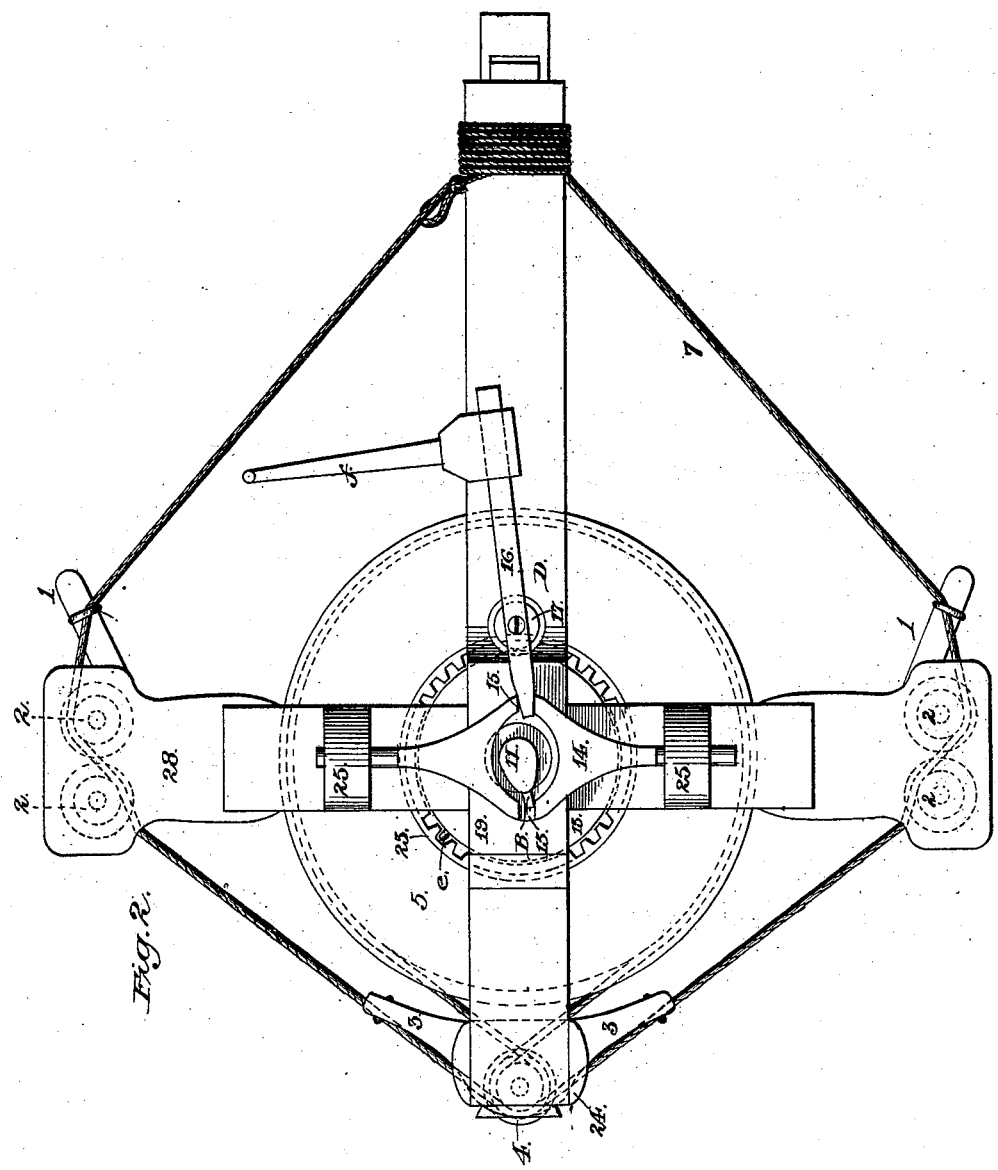
Attest:
Charles R. Wheeler
E. D. Richardson
Inventor:
Seth W. Perkins

UNITED STATES PATENT OFFICE.

SETH W. PERKINS, OF CAMBRIDGE, ILLINOIS.

IMPROVEMENT IN CHECK-ROWERS FOR CORN-PLANTERS.

Specification forming part of Letters Patent No. 210,143, dated November 19, 1878; application filed April 5, 1878.

*To all whom it may concern:*

Be it known that I, SETH W. PERKINS, of Cambridge, in the county of Henry and State of Illinois, have invented certain new and useful Improvements in Check-Rowers; and I do hereby declare the following to be a full, clear, and exact description thereof, reference being had to the accompanying drawing, and to the letters of reference marked thereon.

The nature of my invention consists in the construction and arrangement of a check-row attachment for corn-planters, as will be hereinafter more fully set forth, and pointed out in the claims.

In the annexed drawings, to which reference is made, and which fully illustrate my invention, Figure 1 is a perspective view of my invention. Fig. 2 is a bottom view of the same.

D represents the frame, made in the form of a four-armed cross, in the center of which is journaled an upright spindle, 11. This spindle is provided with a collar, which rests in the boxing 20 in the center of the frame, and above said boxing the spindle has a disk, 13, secured thereon, said disk being provided with a pin, $e$, projecting therefrom on one side. On the spindle 11 is further placed an elongated sleeve or boxing, provided at its lower end with a collar, 23, provided on its under side with an internal cog-gear, 3, into which the pin $e$ is to take when the collar 23 is dropped down over the disk 13. 5 represents a large pulley placed on the boxing of the collar 23, and fastened by a set-screw, $c$. On two opposite arms of the frame D are standards 28, each of which carries two pulleys, 2 2, and a swinging arm, 1, having a pendent eye at its outer end. Upon one of the other arms of the frame is a post, 24, which carries a single pulley, 4, and two swinging arms, 3 3, having pendent eyes at their outer ends. Upon the fourth arm of the frame is located the device for throwing in and out of gear, as hereinafter described. 7 is the rope for operating the check-rower. One end of this rope is fastened behind the machine, and then brought forward through the eye on the arm 1 on that side between the two pulleys 2 2, then through a guide-opening in the standard 28 to the guide-arm 3, and over the pulley 4, and around the opposite way on the pulley 5; then back over the pulley 4 and through the guide-eye of the other arm, 3, through the opening in the opposite standard 28 between the pulleys 2 2, and through the guide-eye on the other arm, 1, and to the opposite side of the field. A suitable brake is to be put on the rope-wheel 5 to keep it from running off faster than wanted.

The mechanism for throwing in and out of gear consists of a lever, 18, pivoted on a post, 27, and its outer end mortised and passing over a post, 10. The inner end of the lever 18 is forked, and straddles the boxing 23 below the wheel 5, so as to raise the wheel by pressing down the outer end of the lever, and thus releasing the gear on the collar 23 from the pin $e$ on the disk 13. On the outer end of the lever 18 is pivoted a button or catch, 9, to take into a notch on the post 10, and hold the wheel 5 out of gear. By releasing this catch the wheel is thrown in gear again.

The inner end of the lever 18 is provided with an arm, 12, which extends downward and projects under the collar or disk 13. This portion of the arm is provided with a rubber piece, A. When the lever 18 is moved and locked to hold the wheel 5 out of gear, the rubber A is at the same time pressed against the under side of the disk 13, and thus keeps the shaft 11 from revolving.

Below the frame D the lower end of the shaft 11 is provided with an arm, B, which works in an oblong slot or opening in the center of a slide, 14, having its bearings in boxes 25. In each of the longest points of the opening in the slide 14 is a notch, 15. The arm B passes into these notches and throws the slide to one side sufficiently far to let the arm B pass along the inner side of the opening, and not allow the slide to work either way until the arm B passes into the opposite notch 15. Then it throws the slide to the other side, and so on alternately from side to side.

16 represents a pivoted lever, which works on a post, 17, and its inner end resting in one of the notches 15. On the other end of the lever 16 is an adjustable arm or rod, $f$, which is to connect with the slide-bar of the planter, and thus any desired length of stroke of the planter can be obtained.

The main wheel 5 is provided with two rope-grooves, as shown, so that the rope may be changed for planting at different distances apart. This wheel can be removed and a smaller one substituted for planting broom-corn, beans, or other seed.

When changing the wheel 5 for a smaller one the post 24 should be moved inward to bring the pulley 4 in proper position. With this check-rower it makes no difference how the rope shrinks or stretches it will always check the same width. The device can be attached to any planter.

Having thus fully described my invention, what I claim as new, and desire to secure by Letters Patent, is—

1. In a check-rower operated by a rope, the combination, with the main wheel 5, of the standards 28 28, each having two pulleys, 2 2, and swinging arm 1, the standard 24, with single pulley 4 and two swinging arms, 3, and the rope 7, arranged in and around the various parts, substantially as and for the purposes herein set forth.

2. In a check-rower operated by a rope, the combination of the spindle 11, with disk 13, having pin $e$, the boxing and collar 23, with internal gear, and the wheel 5, with set-screw $c$, all arranged upon the same vertical shaft or spindle, substantially as herein set forth.

3. The lever 18, with pivoted catch 9 and arm 12, having rubber A, in combination with the wheel 5 and disk 13, for throwing the wheel out of gear and locking the spindle, as herein set forth.

SETH W. PERKINS.

Witnesses:
    CHARLES R. WHEELER,
    E. D. RICHARDSON.